(12) United States Patent
Sano

(10) Patent No.: US 10,290,166 B2
(45) Date of Patent: May 14, 2019

(54) LINEAR LIGHT SOURCE, OPTICAL SENSOR, DIFFERENTIATION UNIT, AND AUTOMATIC TRANSACTION APPARATUS USING THE SAME

(71) Applicant: Oki Electric Industry Co., Ltd., Tokyo (JP)

(72) Inventor: Takashi Sano, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 162 days.

(21) Appl. No.: 15/111,508

(22) PCT Filed: Dec. 10, 2014

(86) PCT No.: PCT/JP2014/082634
§ 371 (c)(1),
(2) Date: Jul. 14, 2016

(87) PCT Pub. No.: WO2015/162821
PCT Pub. Date: Oct. 29, 2015

(65) Prior Publication Data
US 2016/0335826 A1    Nov. 17, 2016

(30) Foreign Application Priority Data

Apr. 21, 2014   (JP) ................. 2014-087387

(51) Int. Cl.
*G07D 7/12*       (2016.01)
*G01J 1/04*       (2006.01)
(Continued)

(52) U.S. Cl.
CPC ................. *G07D 7/12* (2013.01); *F21S 2/00* (2013.01); *G02B 6/0026* (2013.01); (Continued)

(58) Field of Classification Search
CPC ...... G07D 7/12; G02B 6/0068; G02B 6/0085; G02B 6/0026; G02B 6/0076; H04N 5/332; G07F 19/202; G01J 1/429; G01J 1/0437
(Continued)

(56) References Cited

U.S. PATENT DOCUMENTS

2002/0015145 A1   2/2002  Numata
2004/0240722 A1  12/2004  Tsuji et al.
(Continued)

FOREIGN PATENT DOCUMENTS

JP    H08-152359 A    6/1996
JP    2001-357429 A  12/2001
(Continued)

*Primary Examiner* — Zaihan Jiang
(74) *Attorney, Agent, or Firm* — Rabin & Berdo, P.C.

(57) ABSTRACT

[Object] To reduce the influence on a visible light LED exerted by ultraviolet light applied by an ultraviolet light LED.

[Solution] A linear light source including an ultraviolet light emitting diode (1a), a visible light emitting diode (3a), and a light guide (5). The ultraviolet light emitting diode (1a) and the visible light emitting diode (3a) are disposed at least at one end in an optical axis direction of the light guide (5), and are disposed with an optical axis shifted and by providing a level difference in the optical axis direction. Here, the ultraviolet light emitting diode (1a) and the visible light emitting diode (3a) are mounted on an inverted L-shaped heat sink (6a), and an ultraviolet light blocking filter (2) is disposed in front of the visible light emitting diode (3a).

2 Claims, 12 Drawing Sheets

(51) Int. Cl.
    *G07F 19/00*         (2006.01)
    *G01J 1/42*          (2006.01)
    *F21V 8/00*          (2006.01)
    *H04N 5/33*         (2006.01)
    *F21S 2/00*          (2016.01)
    *G07D 7/121*        (2016.01)
    *G07D 7/1205*      (2016.01)

(52) U.S. Cl.
    CPC ......... *G02B 6/0068* (2013.01); *G02B 6/0076* (2013.01); *G02B 6/0085* (2013.01); *G07D 7/121* (2013.01); *G07D 7/1205* (2017.05)

(58) Field of Classification Search
    USPC .......................................................... 348/92
    See application file for complete search history.

(56) References Cited

U.S. PATENT DOCUMENTS

| | | | | |
|---|---|---|---|---|
| 2005/0211914 A1* | 9/2005 | Franken | .................... | G06K 7/12 250/461.1 |
| 2006/0115139 A1* | 6/2006 | Joshi | ...................... | G07D 7/121 382/135 |
| 2006/0159329 A1* | 7/2006 | Joshi | ...................... | G07D 7/121 382/135 |
| 2008/0035866 A1* | 2/2008 | Goodwin | .................. | B07C 3/14 250/505.1 |
| 2008/0259314 A1* | 10/2008 | Kamijo | .................... | G07D 7/12 356/51 |
| 2010/0101317 A1* | 4/2010 | Ashrafzadeh | ....... | G01F 23/0061 73/149 |
| 2010/0102234 A1* | 4/2010 | Hamasaki | .............. | G07D 7/121 250/341.7 |
| 2011/0052082 A1* | 3/2011 | Parkov | ................. | G06K 9/2018 382/209 |
| 2013/0015358 A1* | 1/2013 | Leard | ..................... | G01J 1/0411 250/362 |
| 2014/0175989 A1* | 6/2014 | Arai | ......................... | F21V 9/40 315/154 |
| 2014/0218734 A1* | 8/2014 | Shimaoka | .............. | G07D 7/121 356/369 |
| 2014/0347471 A1* | 11/2014 | Blazevic | ............ | G01N 21/8806 348/128 |
| 2015/0373284 A1* | 12/2015 | Blazevic | ................ | G01N 21/95 348/143 |

FOREIGN PATENT DOCUMENTS

| | | |
|---|---|---|
| JP | 2004-355262 A | 12/2004 |
| JP | 2005-118207 A | 5/2005 |
| JP | 2007-251353 A | 9/2007 |
| JP | 2011-223389 A | 11/2011 |

* cited by examiner

PLANE VIEW

SIDE VIEW

CROSS-SECTION VIEW

CROSS-SECTION VIEW

FRONT VIEW

PLANE VIEW

CROSS-SECTION VIEW

BOTTOM VIEW

DIFFUSION RATE

CROSS-SECTION VIEW

FRONT VIEW

CROSS-SECTION VIEW

FRONT VIEW

CROSS-SECTION VIEW

FRONT VIEW

CROSS-SECTION VIEW

FRONT VIEW

CROSS-SECTION VIEW

FRONT VIEW

LINEAR LIGHT SOURCE, OPTICAL SENSOR, DIFFERENTIATION UNIT, AND AUTOMATIC TRANSACTION APPARATUS USING THE SAME

TECHNICAL FIELD

The present invention relates to a linear light source, an optical sensor, a differentiation unit, and an automatic transaction apparatus using the same, and in particular, a linear light source, an optical sensor, a differentiation unit, and an automatic transaction apparatus using the same, used for differentiation of a bank note.

BACKGROUND ART

An automatic transaction apparatus such as an ATM or a ticket vending machine is provided with a differentiation unit for differentiating the authenticity of bank notes, and this differentiation unit includes an optical sensor for capturing an image of a bank note being transported. This optical sensor includes a line sensor, and a linear light source for illuminating a bank note.

Paragraph [0003] of Patent Literature 1 describes that, since a genuine bank note and a color copied counterfeit note have different wavelengths of light transmitting through them, a light source with a plurality of wavelengths is used. Further, FIG. 15 and paragraph [0022] of Patent Literature 1 describe an identification sensor, constituting a light projection unit on an upper part by ultraviolet light, infrared light, and green light LEDs, and a light guide plate, and constituting a light transmission-reception unit on a lower part by infrared light, green light, and blue light LEDs, a photodiode array, and a light guide plate. Further, FIG. 16 and paragraph [0022] describe an example, constituting a light projection unit on an upper part by infrared light, green light, and ultraviolet light LEDs, and a light guide plate, and constituting a light transmission-reception unit on a lower part by infrared light, green light, blue light, and ultraviolet light LEDs, a photodiode array, and a light guide plate.

In particular, the ultraviolet light LED (LED array) of the light projection unit on the upper part described in FIG. 16 is arranged so as to irradiate the photodiode array via a bank note, and so does not directly irradiate the visible light LEDs. Further, since the visible light LEDs of the light transmission-reception unit on the lower part irradiate a bank note, the ultraviolet light LED (LED array) is configured so as to irradiate a bank note via a second light guide plate, and to additionally irradiate the rear surface side of the visible light LEDs. Accordingly, the visible light LEDs of the light transmission-reception unit on the lower part are not configured so as to directly irradiate the visible light LEDs.

CITATION LIST

Patent Literature

Patent Literature 1: JP 2001-357429A (FIGS. 15, 16)

SUMMARY OF INVENTION

Technical Problem

That is, the ultraviolet light LED described in Patent Literature 1 is constituted as a transmission-type sensor for causing ultraviolet light to be transmitted through a bank note, and detecting this transmitted light with a photodiode array, and the visible light LEDs are constituted as transmission-type sensors and reflection-type sensors.

Incidentally, in an LED, while a semiconductor element is covered with a transparent resin, and an orientation characteristic of light is adjusted, the LED will have characteristics for radiating weak light not only in an optical axis direction, but also on a surface perpendicular to the optical axis direction. Accordingly, an ultraviolet light LED will sometimes cause ultraviolet light to be incident on an adjacently arranged visible light LED. On the other hand, since lattice imperfections or impurities sometimes exist, a visible light LED will sometimes emit weak visible light, by having ultraviolet light applied by an ultraviolet light LED excite the visible light LED. Accordingly, a problem will occur where a light receiving element detects both a fluorescent response by ultraviolet light and scattered light (reflected light) by weak visible light.

In order to solve such a problem, the present invention aims to provide a linear light source, an optical sensor, a differentiation unit, and an automatic transaction apparatus using the same, which can reduce the influence on a visible light LED exerted by ultraviolet light applied by an ultraviolet light LED.

Solution to Problem

A means of the present invention is a linear light source including an ultraviolet light emitting diode, a visible light emitting diode, and a light guide. The ultraviolet light emitting diode and the visible light emitting diode are disposed at least at one end in an optical axis direction of the light guide, and are disposed by providing a level difference in the optical axis direction.

According to this, direct light emitted in an approximately perpendicular direction with respect to an optical axis direction, by an ultraviolet light emitting diode, will not be incident on a visible light emitting diode. Accordingly, since the visible light emitting diode is not excited by ultraviolet light, the visible light emitting diode will not perform unnecessary light emission.

Another means of the present invention is a linear light source including an ultraviolet light emitting diode, a visible light emitting diode, and a light guide. A cross-sectional approximate T-shaped heat sink with a convex part formed on a metal flat plate is provided on an end part of the light guide. The ultraviolet light emitting diode and the visible light emitting diode are adjacently arranged on a base part of the heat sink. Ultraviolet rays emitted by the ultraviolet light emitting diode are shielded by the convex part, and are not incident on the adjacently arranged visible light emitting diode.

Advantageous Effects of Invention

According to the present invention, the influence on a visible light LED exerted by ultraviolet light applied by an ultraviolet light LED can be reduced.

DESCRIPTION OF EMBODIMENTS

Figure 1A:
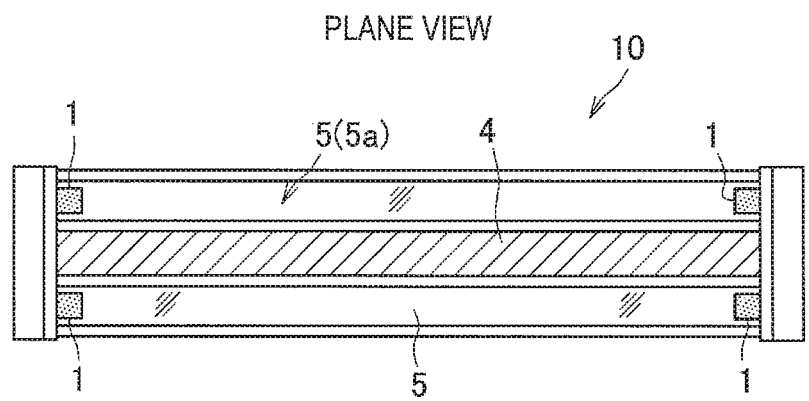
FIG. 1A is a plane view of an optical sensor of a first embodiment of the present invention.

Hereinafter, the modes of the present invention (hereinafter, called the "embodiments") will be described by using the figures. Note that each figure is merely a schematic illustration to the extent that the present invention can be sufficiently understood. Further, in each of the figures, the same reference numerals are attached to common configuration elements and similar configuration elements, and overlapping descriptions will be omitted.

First Embodiment

Figure 1B:
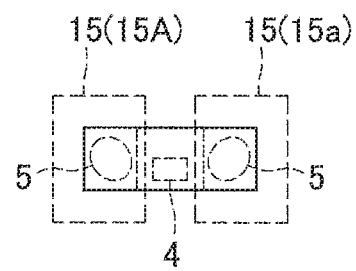
FIG. 1B is a side view of the optical sensor of the first embodiment of the present invention.

FIG. 1A is a plane view of an optical sensor of a first embodiment of the present invention, and FIG. 1B is a side view of this. Note that the front view corresponds to the front view of a linear light source 15a shown in FIG. 2B. An optical sensor 10 includes two linear light sources 15 (15a, 15A) and a light receiving element 4, and the linear light sources 15a, 15b each include UV light LEDs 1 as ultraviolet light emitting diodes (hereinafter, called an "ultraviolet light emitting means"), visible light LEDs 3 (not illustrated) as visible light emitting diodes (hereinafter, called a "visible light emitting means"), and a light guide 5a. The light receiving element 4 is a line sensor, includes, for example, a photodiode array, a lens array or the like, and detects ultraviolet light and visible light. The two linear light sources 15a, 15A are provided side by side so as to sandwich the light receiving element 4.

Figure 2A:
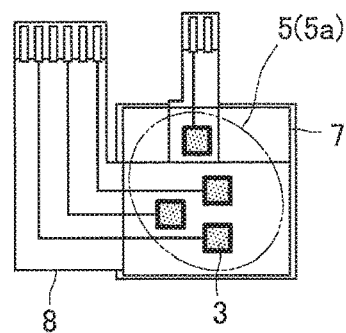
FIG. 2A is a cross-section view of a linear light source included in the optical sensor of the first embodiment of the present invention.
Figure 2B:
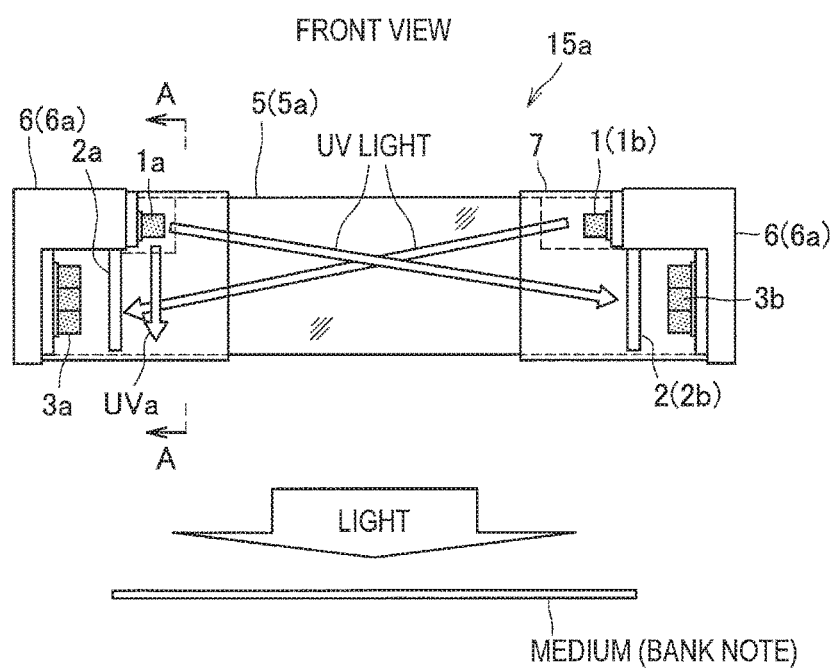
FIG. 2B is a front view of the linear light source included in the optical sensor of the first embodiment of the present invention.

FIG. 2 is a front view and a cross-section view of a linear light source. The cross-section view of FIG. 2A is an A-A cross-section view in which a substrate is viewed in a left direction, and FIG. 2B is a front view. In addition to the above described UV light LEDs 1 (1a, 1b), visible light LEDs 3 (3a, 3b), and light guide 5a, the linear light source 15a additionally includes UV cutoff filters 2 (2a, 2b) as ultraviolet light blocking filters, a heat sink 6 (6a), a substrate 8 disposed on the heat sink 6a, and a holder 7 for fixing the light guide 5 to the heat sink 6a. That is, the UV cutoff filter 2a and the heat sink 6a are included at one end of the light guide 5a, and the UV cutoff filter 2b and the heat sink 6b are included at the other end of the light guide 5a. Further, since only the direction of the oval, which is the cross-sectional shape of the light guide 5a, is different for a linear light source 15b, a description of this will be omitted.

This UV light LED 1 radiates ultraviolet rays (ultraviolet light) of a wavelength of 370-375 nm, and the visible light LED 3 includes LEDs emitting red (660 nm), blue (450-475 nm), and green (520 nm) light, and is sometimes called a set of visible light LEDs 3.

The UV light LED 1 and the red, blue, and green set of visible light LEDs 3 have an emitting surface of a semiconductor element that is formed in a plane shape, and this emitting surface has a more uniform orientation characteristic than that of laser light. However, the UV light LED 1 and the red, blue, and green set of visible light LEDs 3 have a semiconductor element that is covered with a lens-shaped transparent resin, and have an orientation characteristic where they radiate strong light (ultraviolet rays or visible light) in an optical axis direction and the intensity or brightness becomes weaker as proceeding in a direction perpendicular to the optical axis direction. That is, while the UV light LED 1 and the red, blue, and green set of visible light LEDs 3 radiate light strongly in the optical axis direction, radiated light will also exist that is radiated in a direction perpendicular to the optical axis direction. Note that a compound semiconductor such as GaN (example: ultraviolet, blue, green), GaAs (example: red), or GaP (example: green) can be used as the main raw material of an LED (cladding layer).

The heat sink 6a is a metallic medium formed in a cross-sectional inverted L-shape, has the UV light LED 1 arranged on the plane surface of the end part of a longer side direction (convex part), and has the three visible light LEDs 3 adjacently arranged on the plane surface of a concave part. That is, the UV light LED 1 and the three visible light LEDs 3 are disposed with an optical axis shifted and by providing a level difference in an optical axis direction. Further, the heat sink 6a is made of a metal with good thermal conductivity such as aluminum or copper, and does not transmit ultraviolet light or visible light. Note that if it is formed with aluminum, while it is preferable for the heat sink 6a to be plated with a black almite for reflection prevention, it may be a white almite.

The light guide 5a is an ultraviolet-transmitting medium with a cross-section that is oval shaped, and is formed as a shaft body so that the UV light LED 1 and the three visible light LEDs 3 are contained within the oval. Further, the UV light LED 1 and the three visible light LEDs 3 are provided on both end parts in the longer side direction of the light guide 5a, the UV light LEDs 1 are arranged at positions facing each other, and the visible light LEDs 3 are arranged at positions facing each other. Further, as shown in the side view of FIG. 1, the two light guides 15a and 15b are disposed inclined so that the long axes of the ovals intersect, and are disposed so that a medium (bank note) (FIG. 2) passes through in the vicinity of the intersection of the long axes. Note that in the light guide 5a, concave parts (shown by the dotted lines in FIG. 2) for containing the UV light LEDs 1a, 1b are formed at both end parts, and the optical axis direction length of the concave part containing the UV light LED 1a is shorter than the optical axis direction length of the concave part containing the UV light LED 1b.

The UV cutoff filters 2 (2a, 2b) are filters for shielding (blocking) ultraviolet light (UV light, ultraviolet rays) and transmitting visible light, and are disposed in front of the visible light LEDs 3 (3a, 3b). The UV cutoff filters 2 (2a, 2b) are disposed closer to the visible light LEDs 3a, 3b side than the mounting surfaces of the UV light LEDs 1a, 1b, and are deposited on the end surfaces of the light guide 5a. The holder 7 fixes the light guide 5 (5a) to the heat sink 6 (6a), is made of a non-transmitting medium, and prevents light applied from the side surfaces of the UV light LED 1 and the visible light LEDs 3 from being emitted to the outside.

(Operation of the Linear Light Source)

Here, the operation of the linear light source 15a will be described, by using the front view of FIG. 2B.

The UV light LED 1 (1a) radiates ultraviolet rays in an optical axis direction and a direction perpendicular to the optical axis direction, and so radiates ultraviolet rays in the direction of the facing visible light LED 3b. However, since the UV light LED 1a and the visible light LED 3a are adjacently arranged by providing a level difference in the optical axis direction (the longer side direction of the light guide 5a), ultraviolet rays applied in a direction perpendicular to the optical axis direction of the UV light LED 1a will be applied to the holder 7, and will not be applied to the adjacently arranged visible light LED 3a. Further, since the UV cutoff filter 2 is provided in front of the visible light LED 3b, ultraviolet rays (ultraviolet light) will be blocked (shielded), and will not be incident on the visible light LED 3b. That is, the UV light LED 1a does not apply ultraviolet rays to the visible light LEDs 3a, 3b.

Similarly, since the UV light LED 1b and the visible light LED 3b are adjacently arranged by providing a level difference, ultraviolet rays applied in a direction perpendicular the optical axis direction of the UV light LED 1b will be applied to the holder 7, and will not be applied to the adjacently arranged visible light LED 3b. Further, while the UV light LED 1b applies ultraviolet rays in the direction of the visible light LED 3a, these ultraviolet rays will be blocked, by the UV cutoff filter 2a, and will not be incident on the visible light LED 3a. Therefore, since the visible light LEDs 3a, 3b are not excited by ultraviolet rays, even if lattice imperfections or impurities exist, weak visible light will not be emitted by photoluminescence.

When the heat sink 6a is white anodized, reflected ultraviolet rays (reflected ultraviolet light) that have been reflected, by having ultraviolet rays radiated by the UV light LED 1a of one end reflected by the white almite of the heat sink 6a of the other end, will sometimes travel in the direction of the visible light LED 3a. However, these reflected ultraviolet rays will be blocked by the UV cutoff filter 2a, and will not be incident on the visible light LED 3a.

Further, since the UV light LEDs 1 (1a, 1b) and the visible light LEDs 3 (3a, 3b) are arranged at both ends of the light guide 5, ultraviolet rays applied at the other end by the UV light LED 1a arranged at one end of the light guide 5 will be weak. However, the UV light LED 1b arranged at the other end of the light guide 5 will apply strong ultraviolet rays, at the weakened irradiation position. In this way, ultraviolet rays will be uniformly applied in the axial direction. Similarly, while visible light applied at the other end by the visible light LED 3a arranged at one end of the light guide 5 is weak, the visible light LED 3b arranged at the other end of the light guide 5 will apply strong visible light. In this way, visible light will be uniformly applied in the axial direction.

Figure 3:
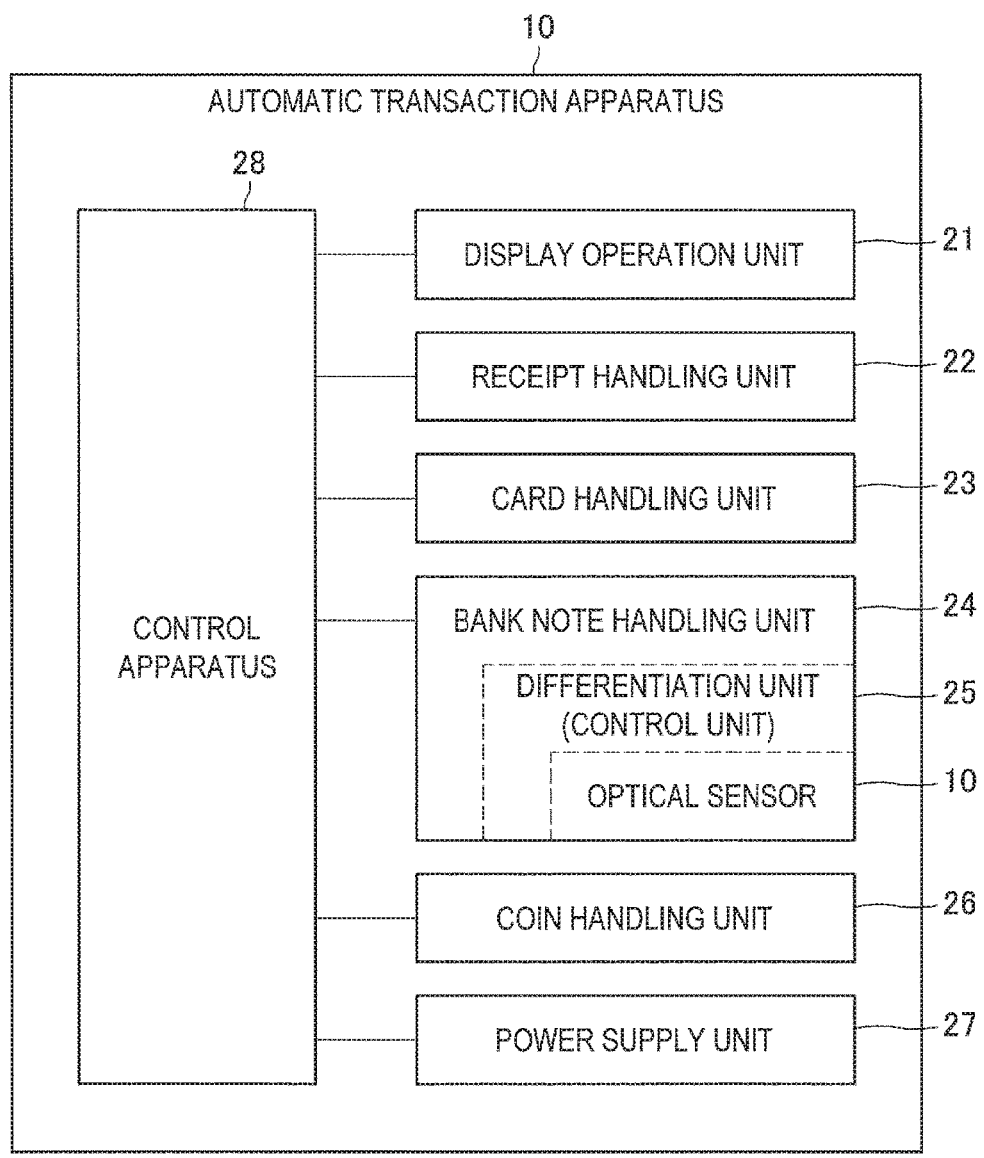
FIG. 3 is a configuration diagram of an automatic transaction apparatus in which the optical sensor of the first embodiment of the present invention is used.

FIG. 3 is a configuration diagram of an automatic transaction apparatus in which the optical sensor of the first embodiment of the present invention is used.

An automatic transaction apparatus 10 is an ATM arranged in a financial institution, a distribution institution or the like, and includes a display operation unit 21, a receipt handling unit 22, a card handling unit 23, a bank note handling unit 24, a coin handling unit 26, a power supply unit 27, and a control apparatus 28.

The display operation unit 21 is a touch panel type Liquid Crystal Display (LCD), and a transaction screen is displayed. The receipt handling unit 22 is a printer for printing transaction contents on a slip. The card handling unit 23 is a unit for reading information stored on a magnetic tape or IC affixed to a financial card, and storing read information on an IC.

The bank note handling unit 24 is a mechanism unit for differentiating bank notes (paper sheets) inserted into a bank note insertion port, and counting for each denomination. That is, the bank note handling unit 24 includes a differentiation unit 25, and the optical sensor 10, which is the feature component of the present embodiment, is included in the differentiation unit 25. Note that the differentiation unit 25 includes a ROM and a RAM in which programs are stored, and a Central Processing Unit (CPU: control unit), and this control unit alternately current-drives the UV light LED 1 and the visible light LED 3, and causes a medium (a bank note or copy paper) to move in a direction orthogonal to the optical axis direction via a drive unit. In this way, the control unit is configured so that a line sensor (light receiving element 4) detects a fluorescent response of the medium or scattered light (reflected light), and an ultraviolet image (fluorescent image) of the medium and a visible light image of the medium are obtained from an output signal of the line sensor. In particular, since copy paper for a photograph has a high reflection rate of ultraviolet rays, the control unit will determine that it is a forged bank note, when it is a uniform ultraviolet image.

The coin handling unit 26 is a mechanism unit for differentiating coins inserted into a coin insertion port, and counting for each denomination. Further, the bank note handling unit 24 and the coin handling unit 26 also have a function for dispatching bank notes or coins stored inside the automatic transaction apparatus to the outside. The power supply unit 27 is a power supply apparatus for supplying direct-current power to each of the units, by converting alternating-current power from a commercial power supply into direct-current power. The control apparatus 28 is constituted by a Factory Computer (FC), and controls each of the units, by loading an Operations System (OS) or transaction program stored in a nonvolatile storage unit such as a Hard Disk Drive (HDD) in a Random Access Memory (RAM), and executing the loaded OS or transaction program with a CPU.

Second Embodiment

In the first embodiment, the UV light LEDs 1a, 1b and the visible light LEDs 3a, 3b are arranged by providing a level difference in an irradiation direction (optical axis direction), but the UV light LED 1a and the visible light LED 3a can be adjacently arranged on the same plane surface, without providing a level difference, and ultraviolet rays can be blocked by forming the heat sink 6 with a cross-sectional T-shape.

Figure 4A:
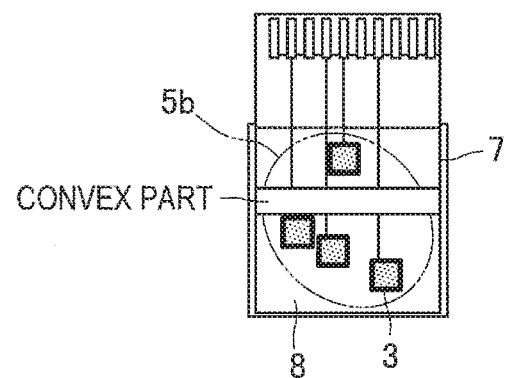
FIG. 4A is a cross-section view of a linear light source of a second embodiment of the present invention.
Figure 4B:
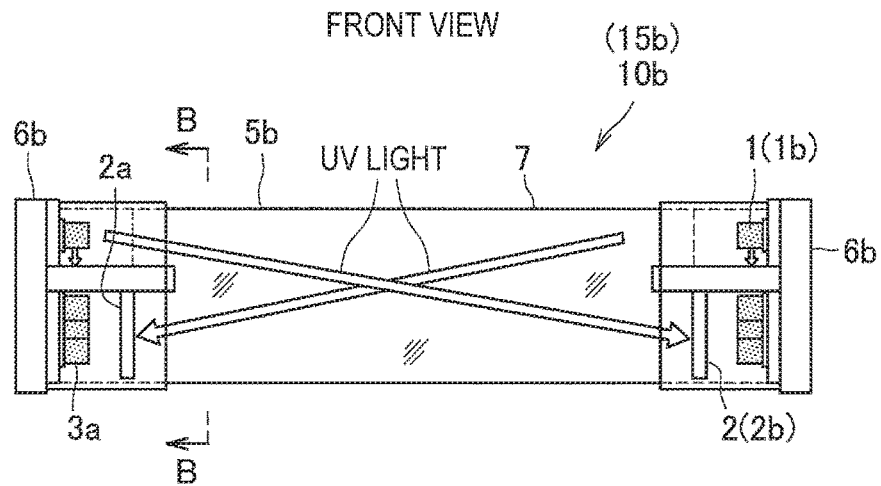
FIG. 4B is a front view of the linear light source of the second embodiment of the present invention.

FIG. 4 is a front view and a cross-section view of a linear light source of a second embodiment of the present invention, FIG. 4A is a B-B cross-section view, and FIG. 4B is a front view.

Similar to the above described embodiment, a linear light source 15b of an optical sensor 10b includes the UV light LEDs 1 (1a, 1b), the visible light LEDs 3 (3a, 3b), a light guide 5b, a heat sink 6b, the substrate 8 disposed on the heat sink 6b, and the holder 7 for fixing the light guide 5 to the heat sink 6b.

However, the heat sink 6b is formed in a cross-sectional T-shape, different to the heat sink 6a (FIG. 2), and is different for the point of having a difference in the length of the base part of both sides, with respect to a convex part. By this shape of the heat sink 6b, the end part shape of the light guide 5b will also be different to that of the light guide 5a. Note that the difference in the length of the base part is a difference for mounting the three visible light LEDs 3 on the longer part, and mounting the one UV light LED 1 on the shorter part.

The UV light LEDs 1a, 1b are provided on the base part on the side where the length of the heat sink 6b is shorter, and the visible light LEDs 3a, 3b are provided on the base part on the side where the length of the heat sink 6b is longer. That is, the UV light LEDs 1a, 1b and the visible light LEDs 3a, 3b are adjacently arranged, via a convex part of the heat sink 6b. In this way, ultraviolet rays applied in a direction perpendicular to the optical axis, from the UV light LED 1a, are blocked by the convex part of the heat sink 6b, and do not reach the visible light LED 3a. Further, ultraviolet rays (UV light) applied by the UV light LED 1b are blocked by the UV cutoff filter 2a, and so ultraviolet rays do not reach the visible light LED 3a. Therefore, since the visible light LEDs 3a, 3b are not excited, by ultraviolet rays (UV light), weak visible light will not be emitted, for example, by photoluminescence. Note that the points of having the UV light LED 1a and the visible light LED 3a arranged on one end side of the light guide 5b, and having the UV light LED 1b and the visible light LED 3b arranged on the other end side of the light guide 5b, are similar to the above described embodiment.

Third Embodiment

Figure 5A:
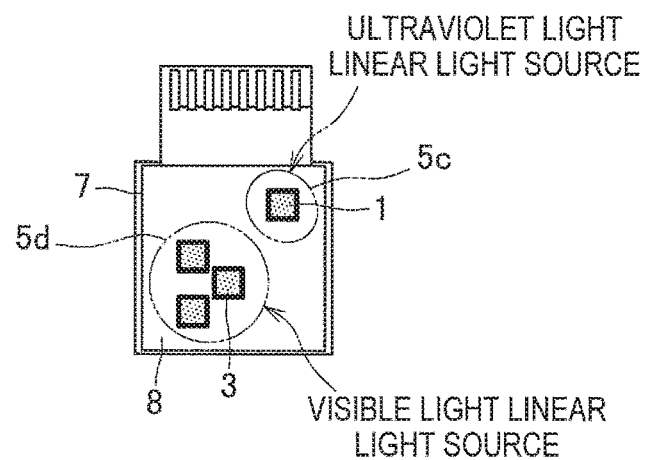
FIG. 5A is a cross-section view of a linear light source of a third embodiment of the present invention.
Figure 5B:
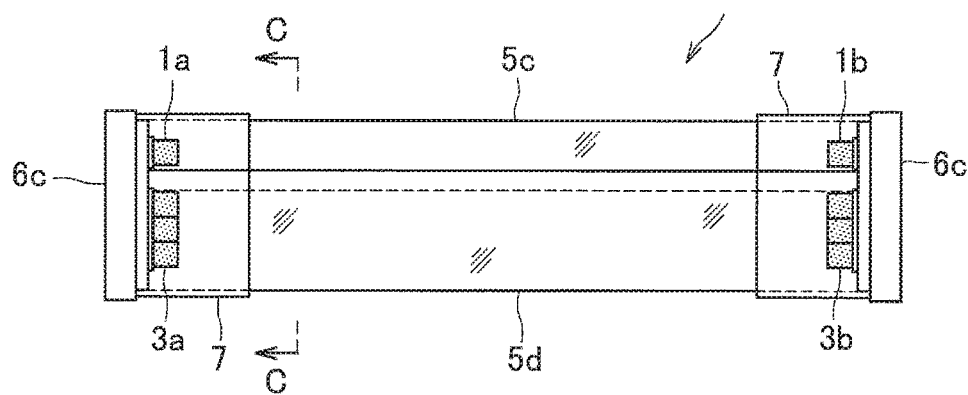
FIG. 5B is a front view of the linear light source of the third embodiment of the present invention.
Figure 6A:
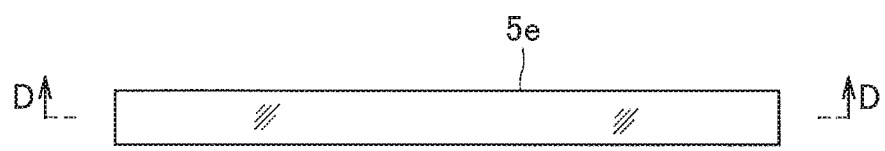
FIG. 6A is a plane view of a light guide used with a linear light source of a fourth embodiment of the present invention.
Figure 6B:
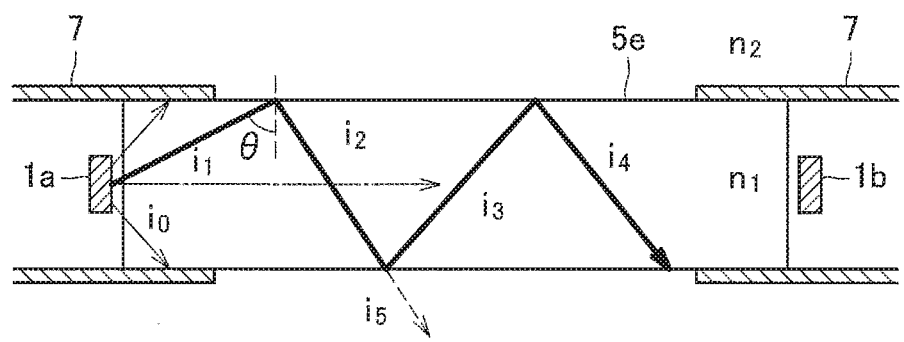
FIG. 6B is a cross-section view of the light guide used with the linear light source of the fourth embodiment of the present invention.
Figure 6C:
FIG. 6C is a bottom view of the light guide used with the linear light source of the fourth embodiment of the present invention, and is a figure that shows an example of a diffusion rate distribution.
Figure 6D:
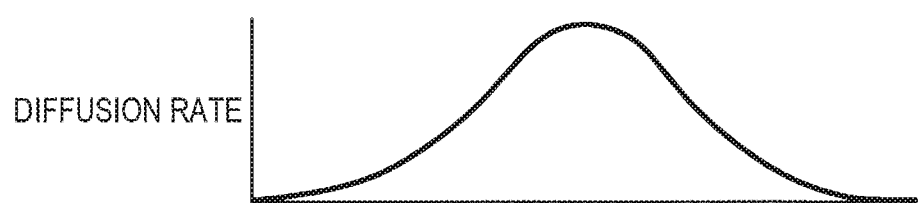
FIG. 6D is a figure that shows another example of a diffusion rate distribution in the linear light source of the fourth embodiment of the present invention.

FIG. 5 is a front view and a cross-section view of a linear light source of a third embodiment of the present invention, FIG. 5A is a C-C cross-section view, and FIG. 5B is a front view.

Similar to the above described first embodiment, a linear light source 15c of an optical sensor 10c includes the UV light LEDs 1a, 1b, the visible light LEDs 3a, 3b, a heat sink 6c, the substrate 8 disposed on the heat sink 6c, and the holder 7. However, the linear light source 5c of the present embodiment does not provide UV cutoff filters 2. Further, the linear light source 15c is different for the points of having two light guides 5c, 5d with cross-sections that are oval shaped, having an ultraviolet light linear light source constituted by the UV light LEDs 1a, 1b and the light guide 5c, and having a visible light linear light source constituted by the visible light LEDs 3a, 3b and the light guide 5d. The outer diameter of this light guide 5c (the length of the long axis and the length of the short axis) is shorter than the outer diameter of the light guide 5d. Further, the heat sink 6c is a square-shaped flat plate.

The light guide 5c, which has a short outer diameter, is arranged in the optical axis direction of the UV light LEDs 1a, 1b, the light guide 5d, which has a long outer diameter, is arranged in the optical axis direction of the visible light LEDs 3a, 3b, and the light guide 5c and the light guide 5d are mutually separated. Since the light guide 5c and the light guide 5d are mutually separated, ultraviolet rays applied by the UV light LEDs 1a, 1b will be totally reflected at the boundary between the outer peripheral surface of the light guide 5c and the air. Accordingly, ultraviolet rays applied by the UV light LEDs 1a, 1b will not reach the visible light LEDs 3a, 3b. Therefore, since the visible light LEDs 3a, 3b are not excited, by ultraviolet rays, weak visible light will not be emitted, for example, by photoluminescence.

Fourth Embodiment

While the light guides 5a to 5d of each of the above described embodiments are a shaft body with a cross-sectional oval shape, a linear light source can also be implemented by using a light guide with a rectangular-parallelopiped shape. That is, the UV light LEDs 1a, 1b, the visible light LEDs 3a, 3b, the light guide 5, the heat sink 6, the substrate 8, and the holder 7, which are the other configuration elements, will be the same as in each of the above described embodiments. Note that the end part shape of the light guide 5 will change in accordance with the shape of the heat sink 6.

FIG. 6 is a structure diagram of a light guide used with a linear light source of a fourth embodiment of the present invention, and is a figure for describing light irradiation. FIG. 6A is a plane view of a light guide, FIG. 6B is a D-D cross-section view, FIG. 6(c) is a bottom view and shows an example of a diffusion rate distribution, and FIG. 6(d) shows another example of a diffusion rate distribution.

A light guide 5e is made of quartz with a rectangular-parallelopiped shape, and transmits ultraviolet rays (ultraviolet light) and visible light. The UV light LED 1a provided at an end part of the light guide 5e has a comparatively uniform orientation characteristic, as described above. For example, an ultraviolet ray $i_0$ applied in the direction of the holder 7 is absorbed by the holder 7. Further, an ultraviolet ray incident to the air (refractive index $n_2$=1.0) from quartz (refractive index $n_1$=1.45) is transmitted when an incident angle $\theta$ is smaller than a critical angle $\theta c = \sin^{-1}(n_2/n_1)$ =43.6°, and is totally reflected when the incident angle $\theta$ is larger than the critical angle $\theta c$. Note that the principle of total reflection will be the same even in an oval shape.

That is, an ultraviolet ray $i_1$ of the critical angle $\theta c$ applied by the UV light LED 1a is totally reflected at the boundary between the light guide 5e and the air, becomes an ultraviolet ray $i_2$, and travels straight ahead. Then, the ultraviolet light $i_2$ is again totally reflected at the opposite surface of the boundary at which the ultraviolet ray $i_1$ is totally reflected, and becomes an ultraviolet ray $i_3$. Then, the ultraviolet ray $i_3$ repeats a total reflection, and is guided. Further, an ultraviolet ray reaching the end part of the light guide 5e (the UV light LED 1b side) will have light with an incident angle larger than the critical angle θc returned to the UV light LED 1a side, by being totally reflected, and an ultraviolet ray with an incident angle smaller than the critical angle θc will be transmitted from the end surface. In the vicinity of the UV light LEDs 1a, 1b, ultraviolet rays with an incident angle larger than the critical angle θc exist, and so ultraviolet rays will be strongly radiated to the outside of the light guide 5e, and at the axial direction center part of the light guide 5e, ultraviolet rays become only totally reflected light, and so will not be radiated to the outside of the light guide 5e.

Since ultraviolet rays are not radiated to the outside in the vicinity of the axial direction center part of the light guide 5e, the light guide 5e has only one surface (the bottom surface), which is in contact with a medium (bank note), formed in a frosted glass shape, and causes light to be radiated to the outside of the light guide 5e as an ultraviolet ray $i_5$, by causing the light to be scattered at a diffusion surface formed in the frosted glass shape. That is, the light guide 5e raises the diffusion rate of the center part in the axial direction, and causes the diffusion rate of both end parts in an axial direction to be reduced, and consequently, causes ultraviolet rays (scattered light) to be emitted with a uniform intensity in the axial direction. In this way, the light guide 5e diffusively illuminates a medium. Note that the diffusion rate may be changed in stages, or may be continuously changed.

Fifth Embodiment

While the linear light source of each of the above described embodiments provides the UV light LED 1 and the visible light LED 3 at both ends of the light guide 5, they may be provided at only one end.

Figure 7A:
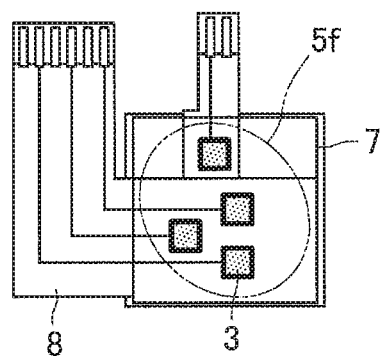
FIG. 7A is a cross-section view of a linear light source of a fifth embodiment of the present invention.
Figure 7B:
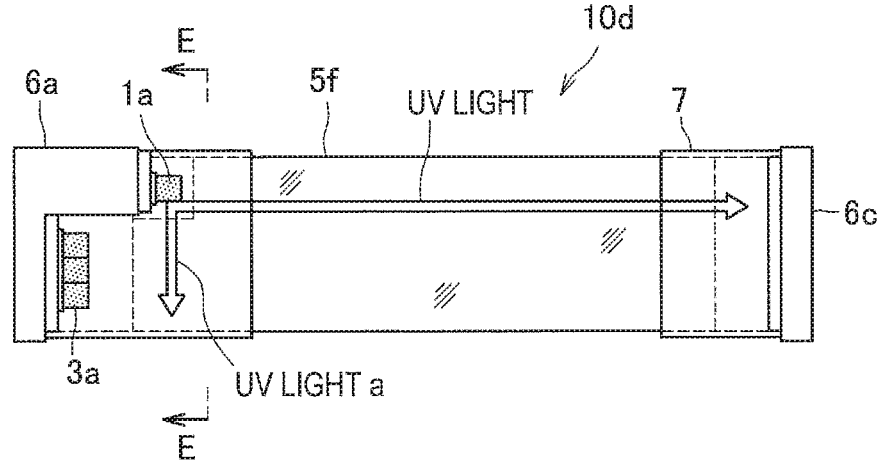
FIG. 7B is a front view of the linear light source of the fifth embodiment of the present invention.

FIG. 7 is a front view and a cross-section view of a linear light source of a fifth embodiment of the present invention, FIG. 7A is an E-E cross-section view, and FIG. 7B is a front view.

In a linear light source 15d used by an optical sensor 10d, a cross-sectional inverted L-shaped heat sink 6a is included at one end of a light guide 5f, and the heat sink 6c is included at the other end of the light guide 5f. As described above, the heat sink 6a is a metallic medium formed in a cross-sectional inverted L-shape, has the UV light LED 1 arranged on the plane surface of the end part of a longer side direction (convex part), and has the three visible light LEDs 3 adjacently arranged on the plane surface of a concave part. The heat sink 6c is a square-shaped flat plate.

The UV light LED 1 has an orientation characteristic where it radiates strong ultraviolet rays (UV light) in an optical axis direction and the ultraviolet intensity becomes weaker as proceeding in a direction perpendicular to the optical axis direction. That is, the UV light LED 1 irradiates ultraviolet rays (UV light) travelling in the optical axis direction and ultraviolet rays (UV light a) travelling in a direction perpendicular to the optical axis direction. The ultraviolet rays (UV light) travelling in the optical axis direction are absorbed by the substrate 8 provided on the heat sink 6c, or are absorbed by a black almite of the heat sink 6c. On the other hand, the ultraviolet rays (UV light a) travelling in a direction perpendicular to the optical axis direction are applied to the holder 7, and are absorbed. Accordingly, since the visible light LED 3a is not excited, by ultraviolet rays (UV light), weak visible light will not be emitted, for example, by photoluminescence.

Sixth Embodiment

In the fifth embodiment, the heat sink 6c is black anodized, and absorbs ultraviolet rays (UV light), but it can also be white anodized (reflecting material) for reflecting or diffusing ultraviolet rays (UV light). In this case, a UV cutoff filter for blocking reflected ultraviolet light is provided in front of the visible light LEDs 3.

Figure 8A:
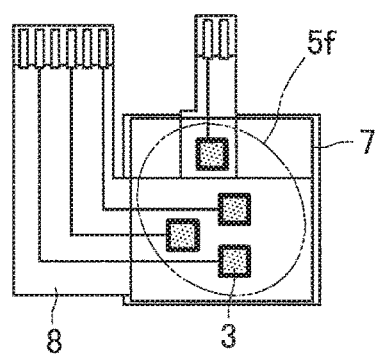
FIG. 8A is a cross-section view of a linear light source of a sixth embodiment of the present invention.
Figure 8B:
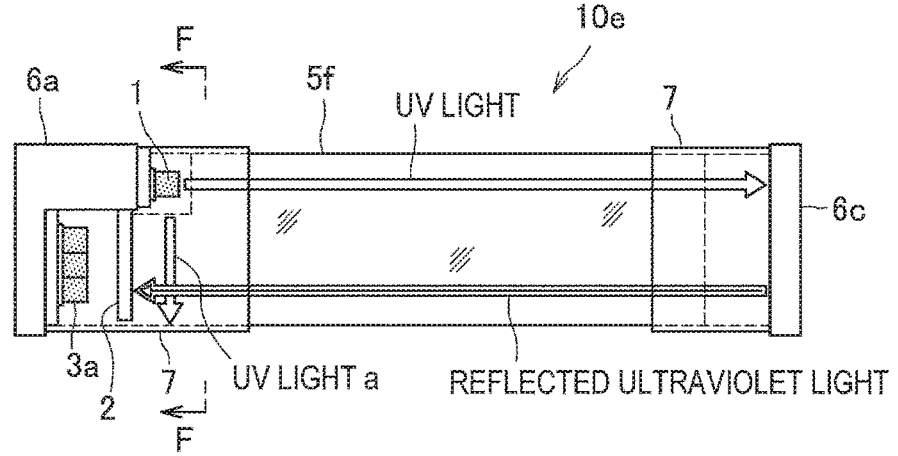
FIG. 8B is a front view of the linear light source of the sixth embodiment of the present invention.

FIG. 8 is a front view and a cross-section view of a linear light source of a sixth embodiment of the present invention, FIG. 8A is an F-F cross-section view, and FIG. 8B is a front view.

Similar to the above described fifth embodiment, in a linear light source 15e of an optical sensor 10e, the inverted L-shaped heat sink 6a is included at one end of the light guide 5f, and the heat sink 6c is included at the other end of the light guide 5f. The heat sink 6a is a metallic medium formed in a cross-sectional inverted L-shape, has the UV light LED 1 arranged on the plane surface of the end part of a longer side direction (convex part), and has the three visible light LEDs 3 adjacently arranged on the plane surface of a concave part.

The heat sink 6c is a square-shaped flat plate, and has white almite applied as a reflecting material. That is, the white anodized heat sink 6c functions as a reflecting material. Note that the reflecting material can be implemented also by depositing a multilayer film on the light guide 5f. That is, the light guide 5f includes a white almite or a deposited film as a reflecting material on the other end side of the UV light LED 1.

The UV light LED 1 has an orientation characteristic where it radiates strong ultraviolet rays (UV light) in an optical axis direction and the ultraviolet intensity becomes weaker as proceeding in a direction perpendicular to the optical axis direction. That is, the UV light LED 1 radiates strong ultraviolet rays (UV light) in the optical axis direction to the heat sink 6c, the light guide 5f guides the ultraviolet light up to the heat sink 6c, the guided ultraviolet light is reflected by the white almite of the heat sink 6c, and is guided in the direction of the visible light LEDs 3, by the light guide 5f. However, in the present embodiment, the ultraviolet rays guided in the direction of the visible light LEDs 3 are shielded by the UV cutoff filter 2, and do not reach the visible light LEDs 3.

Further, the UV light LED 1 applies ultraviolet rays in a direction perpendicular to the optical axis direction to the holder 7, and these ultraviolet rays are absorbed by the holder 7. Therefore, since the visible light LED 3a is not excited, by ultraviolet rays, weak visible light will not be emitted, for example, by photoluminescence.

Figure 9A:
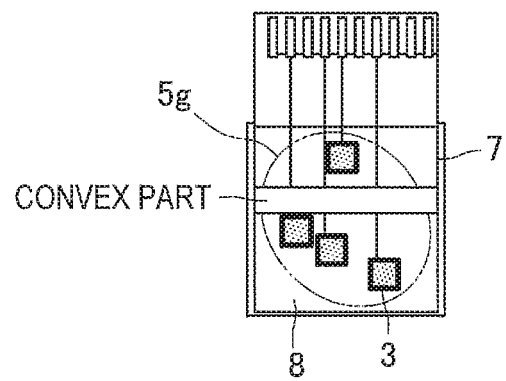
FIG. 9A is a cross-section view of a linear light source of a seventh embodiment of the present invention.
Figure 9B:
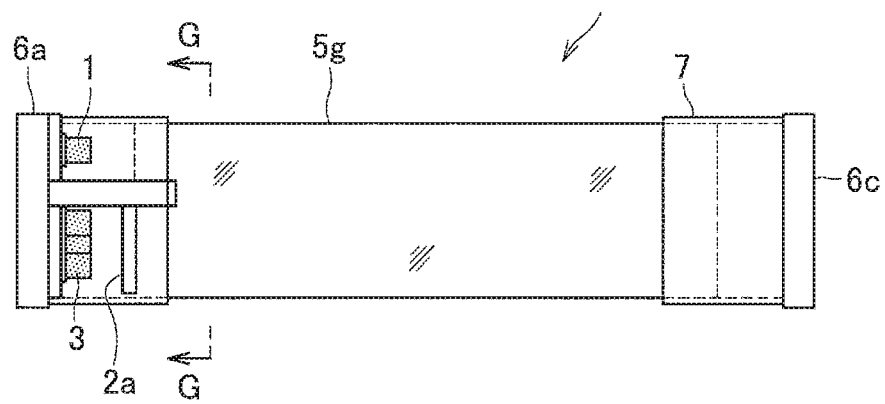
FIG. 9B is a front view of the linear light source of the seventh embodiment of the present invention.

FIG. 9 is a front view and a cross-section view of a linear light source of a seventh embodiment of the present invention, FIG. 9A is a G-G cross-section view, and FIG. 9B is a front view.

A linear light source 15f used by an optical sensor 10f has a T-shaped heat sink 6b disposed at one end of a light guide 5g, and has a heat sink 6c disposed at the other end of the light guide 5g. That is, the UV light LED 1 and the visible light LEDs 3 are adjacently arranged, via a convex part of the heat sink 6b.

The UV light LED 1 radiates strong ultraviolet rays in an optical axis direction to the heat sink 6c, and ultraviolet rays reflected by a white almite of the heat sink 6c are guided in the direction of the visible light LEDs 3. However, also in the present embodiment, the ultraviolet rays guided in the direction of the visible light LEDs 3 are shielded by the UV cutoff filter 2, and do not reach the visible light LEDs 3.

Further, the UV light LED 1 applies ultraviolet rays in a direction perpendicular to the optical axis direction to the side surface of the convex part of the heat sink 6b, and these ultraviolet rays are absorbed. Therefore, since the visible light LED 3a is not excited, by ultraviolet rays, weak visible light will not be emitted, for example, by photoluminescence.

Comparative Examples

Figure 10A:
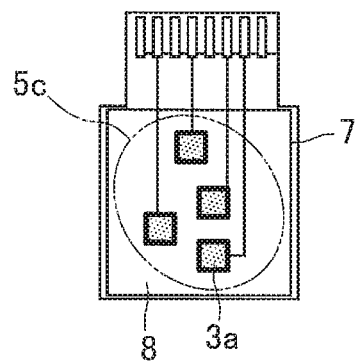
FIG. 10A is a cross-section view of a linear light source in a first comparative example of the present invention.
Figure 10B:
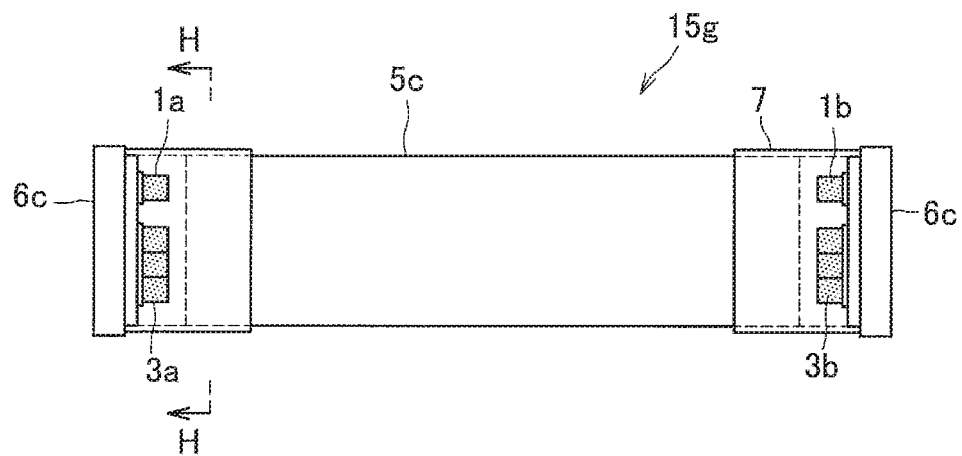
FIG. 10B is a front view of the linear light source in the first comparative example of the present invention.

Since the plane view of an optical sensor in the comparative examples of the present invention is similar to the plane view of FIG. 1, the description of a linear light source will be hereinafter given. FIG. 10 is a front view and a cross-section view of a linear light source in a first comparative example of the present invention, FIG. 10A is an H-H cross-section view, and FIG. 10B is a front view.

A linear light source 15d is similar to those of the first embodiment through to the fourth embodiment, for the point of including the UV light LEDs 1a, 1b, the visible light LEDs 3a, 3b, the light guide 5f, the heat sink 6c, the holder 7, and the substrate 8.

However, the case of the first comparative example is different for the point of having the UV light LED 1a and the visible light LED 3a disposed on the same plane surface at one end of the light guide 5f, and having the UV light LED 1b and the visible light LED 3b disposed on the same plane surface at the other end of the light guide 5f, without providing UV cutoff filters 2.

In the linear light source 15d of the first comparative example, ultraviolet rays applied in the optical axis direction by the UV light LED 1a are applied to the visible light LED 3b, and ultraviolet rays applied in the optical axis direction by the UV light LED 1b are applied to the visible light LED 3a. Further, in the linear light source 15d, ultraviolet rays applied in a direction perpendicular to the optical axis direction by the UV light LED 1a are applied to the visible light LED 3a, and ultraviolet rays applied in a direction perpendicular to the optical axis direction by the UV light LED 1b are applied to the visible light LED 3b. Accordingly, the visible light LEDs 3a, 3b are excited by ultraviolet rays, and emit weak visible light. Accordingly, in the differentiation unit 25 (FIG. 3) of the automatic transaction apparatus 10, trouble will occur where an image including a visible light image is acquired, when only a fluorescent image (an ultraviolet image) is to be acquired by a fluorescent response of a medium (bank note).

Second Comparative Example

Figure 11A:
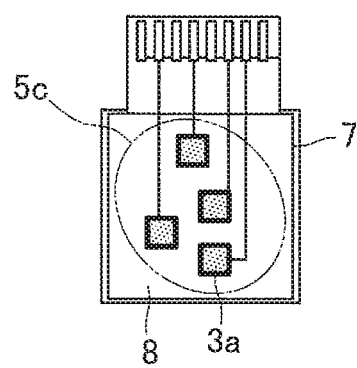
FIG. 11A is a cross-section view of a linear light source in a second comparative example of the present invention.
Figure 11B:
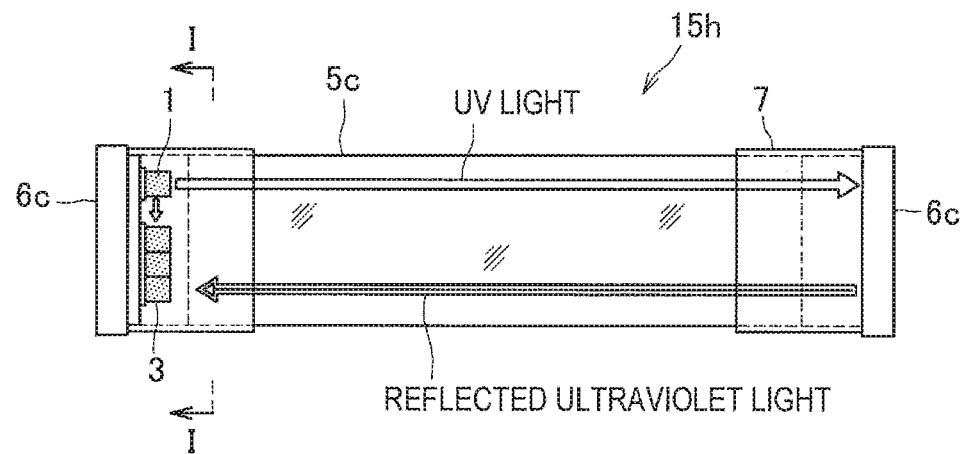
FIG. 11B is a front view of the linear light source in the second comparative example of the present invention.

FIG. 11 is a front view of a linear light source in a second comparative example of the present invention, FIG. 11A is an I-I cross-section view, and FIG. 11B is a front view.

A linear light source 15h includes the heat sink 6c at each end of the light guide 5c, the UV light LED 1 and the three visible light LEDs 3 are mounted on the heat sink 6c of one end, and LEDs are not mounted on the heat sink 6c of the other end. Further, the heat sink 6c of the other end, on which the UV light LED 1 and the three visible light LEDs 3 are not mounted, is plated with a white almite.

The UV light LED 1 applies ultraviolet light, ultraviolet rays (UV light) to the heat sink 6c, and reflected ultraviolet light reflected by the white almite of the heat sink 6c is incident on the visible light LEDs 3. Accordingly, the visible light LEDs 3a, 3b are excited by ultraviolet rays, and emit weak visible light. Accordingly, in the differentiation unit 25 (FIG. 3) of the automatic transaction apparatus 10, trouble will occur where an image including a visible light image is acquired, when only a fluorescent image (an ultraviolet image) is to be acquired by a fluorescent response of a medium (bank note).

Modified Examples

The present invention is not limited to the above described embodiments, and various changes and modifications can be performed within a range not deviating from the scope of the present invention. For example, the following modifications are possible. (1) While the optical sensor of each of the above described embodiments is a reflection-type optical sensor, where the linear light source 15 applies ultraviolet rays or visible light to a medium (bank note), and the light receiving element 4 detects the scattered light, the optical sensor can be constituted as a transmission-type optical sensor, where the linear light source 15 applies ultraviolet light or visible light to a medium (bank note), and the light receiving element 15 detects the transmitted and scattered light. That is, in a transmission-type optical sensor, the light receiving element is provided at a position separated, via a medium, from the linear light sources 15, 15b.

(2) The above fifth embodiment through to the seventh embodiment have one UV light LED 1 and a set of visible light LEDs 3 arranged at one end of the light guide 5. In this case, the ultraviolet intensity (irradiation intensity) of the side where the UV light LED 1 and the set of visible light LEDs 3 are arranged will become strong. However, non-uniformities of this irradiation intensity or the brightness will be canceled if an irradiation surface is set to a diffusion surface, and a gradient is provided to its diffusion rate.

(3) While each of the above described embodiments use a point light source UV light LED 1 as an ultraviolet light emitting means, an ultraviolet Laser Diode (LD) or an ultraviolet lamp may be used. Further, while each of the above described embodiments use a point light source visible light LED 3 as a visible light emitting means, a visible light LD or a visible light lamp can be used.

REFERENCE SIGNS LIST

1 UV light LED (ultraviolet light emitting means, ultraviolet light emitting diode)
2 UV cutoff filter (ultraviolet light blocking filter)
3 visible light LED (visible light emitting means, visible light emitting diode)
4 light receiving element (line sensor)
5, 5a, 5b, 5e, 5f light guide
5c UV light LED light guide
5d visible light LED light guide
6 heat sink, white anodized heat sink (reflecting material)
7 holder
8 substrate
9 medium (bank note)
10 optical sensor
15 linear light source
20 automatic transaction apparatus
21 display operation unit
22 receipt handling unit
23 card handling unit
24 bank note handling unit
25 differentiation unit (control unit)
26 coin handling unit 27 power supply unit
28 control apparatus

The invention claimed is:

1. An optical sensor comprising:
first and second ultraviolet light emitting means;
first and second visible light emitting means;
a light guide; and
a light receiving element,
wherein the ultraviolet light emitting means are arranged to face each other at opposite ends of the light guide,
wherein the visible light emitting means are arranged to face each other at opposite ends of the light guide, and to face one of the first and second ultraviolet light emitting means,
wherein an ultraviolet light blocking filter is disposed in front of each of the visible light emitting means so as to block ultraviolet light emitted by the ultraviolet light emitting means and being incident to the visible light emitting means, the ultraviolet light blocking filter being configured to block ultraviolet light and transmit visible light, and
wherein the light receiving element is provided side by side with the light guide, and receives scattered light, which is one or both of ultraviolet light emitted by the ultraviolet light emitting means and visible light emitted by the visible light emitting means applied to a medium via the light guide and scattered.

2. An optical sensor comprising:
first and second ultraviolet light emitting means;
first and second visible light emitting means;
a light guide; and
a light receiving element,
wherein the ultraviolet light emitting means are arranged to face each other at opposite ends of the light guide,
wherein the visible light emitting means are arranged to face each other at opposite ends of the light guide, and to face one of the first and second ultraviolet light emitting means,
wherein an ultraviolet light blocking filter is disposed in front of each of the visible light emitting means so as to block ultraviolet light emitted by the ultraviolet light emitting means and being incident to the visible light emitting means, the ultraviolet light blocking filter being configured to block ultraviolet light and transmit visible light, and
wherein the light receiving element is disposed facing the light guide via a medium, and receives transmitted light, which is one or both of ultraviolet light emitted by the ultraviolet light emitting means and visible light emitted by the visible light emitting means applied to the medium and transmitted.

* * * * *